United States Patent [19]

Tallent

[11] 4,069,293

[45] * Jan. 17, 1978

[54] METHOD FOR DISSOLVING PLUTONIUM DIOXIDE

[75] Inventor: Othar K. Tallent, Oak Ridge, Tenn.

[73] Assignee: The United States of America as represented by the United States Department of Energy, Washington, D.C.

[*] Notice: The portion of the term of this patent subsequent to Aug. 24, 1993, has been disclaimed.

[21] Appl. No.: 659,826

[22] Filed: Feb. 20, 1976

Related U.S. Application Data

[63] Continuation-in-part of Ser. No. 574,977, May 6, 1975, Pat. No. 3,976,775.

[51] Int. Cl.² ............................................. C01G 56/00
[52] U.S. Cl. ........................................... 423/3; 204/1.5
[58] Field of Search ..................... 204/1.5; 423/3, 251

[56] References Cited

U.S. PATENT DOCUMENTS

| | | | |
|---|---|---|---|
| 3,901,786 | 8/1975 | Wheelwright | 204/1.5 X |
| 3,957,615 | 5/1976 | Diefenbacher et al. | 204/1.5 X |

OTHER PUBLICATIONS

Cleveland, J. M., "The Chemistry of Plutonium", Gordon & Breach Science Publishers, N.Y., 1970, pp. 56-58, 301-303.

Tallent, O. K. et al., "Effect of Oxidation State of Dissolved Plutonium on $PuO_2$ Dissolution", Trans. American Nuc. Soc., June, 1975, pp. 252-253.

*Primary Examiner*—Richard E. Schafer
*Attorney, Agent, or Firm*—Dean E. Carlson; Stephen D. Hamel; Allen H. Uzzell

[57] ABSTRACT

The fluoride-catalyzed, non-oxidative dissolution of plutonium dioxide in $HNO_3$ is significantly enhanced in rate by oxidizing dissolved plutonium ions. It is believed that the oxidation of dissolved plutonium releases fluoride ions from a soluble plutonium-fluoride complex for further catalytic action.

3 Claims, 4 Drawing Figures

METHOD FOR DISSOLVING PLUTONIUM DIOXIDE

BACKGROUND OF THE INVENTION

This invention was made in the course of, or under, a contract with the Energy Research and Development Administration.

CROSS-REFERENCE TO RELATED APPLICATION

This application is a continuation-in-part of application Ser. No. 574,977 filed May 6, 1975 now U.S. Pat. No. 3,976,775 in the name of Othar K. Tallent for "Method for Dissolving Plutonium Dioxide".

The present invention relates generally to the dissolution of plutonium dioxide for nuclear fuel reprocessing, and more specifically to the nitric acid dissolution of plutonium dioxide catalyzed by hydrofluoric acid.

One of the commonly used nuclear fuels is plutonium in the form of the dioxide. The dioxide is suitable for use in nuclear fuel because of its refractivity and its inert nature. For nuclear fuel applications, $PuO_2$ is generally mixed with $UO_2$ in compositions of 15–30% $PuO_2$. In nuclear reactors, particularly the breeder type reactor, the spent fuel is periodically removed and reprocessed to separate the waste materials from the useful products. Methods are available for recovering and purifying plutonium once the material is dissolved in an aqueous nitrate solution. However, $PuO_2$ is relatively difficult to dissolve in pure concentrated nitric acid.

The difficulty of dissolution depends upon the fuel manufacturing process. Fuels experiencing high sintering temperatures resulting in solid solution of the mixed oxides are soluble in 10–12 M nitric acid. Mechanically blended fuels of high $PuO_2$ content which, having been sintered at relatively lower temperature, contain separate $PuO_2$ and $UO_2$ phases are difficultly soluble in 10–12 nitric acid. Preferential dissolution of $UO_2$ usually occurs in these fuels leaving difficultly soluble residues of high $PuO_2$ content. In addition, certain forms of $PuO_2$ which have been fired at very high temperatures to obtain maximum density, such as microspheres having 96–98% theoretical density, are slow to dissolve by any known means. The accumulation of plutonium containing residues in fuel reprocessing plants is very undesirable from a criticality standpoint. The subject invention is particularly applicable to the dissolution of such difficultly soluble $PuO_2$.

PRIOR ART

The problem of dissolving plutonium dioxide is well known in the art of nuclear fuel reprocessing. The prior art methods are generally classifiable into two groups: oxidative dissolution and non-oxidative dissolution. In oxidative dissolution processes, the principal mechanism by which the plutonium dioxide goes into solution is by the oxidation of Pu(IV) in solid $PuO_2$ to a more soluble oxidation state such as Pu(VI). In non-oxidative dissolution, the plutonium dioxide goes into solution without oxidation of Pu(IV) such as by the formation of a soluble Pu(IV) complex.

An example of oxidative dissolution is found in U.S. Pat. No. 3,005,682. The method disclosed therein involved the addition of cerium ions (strong oxidizing agents) to 4 M nitric acid above 115° C. The addition of cerium ions aids in the dissolution of solid $PuO_2$ by oxidizing difficultly soluble $PuO_2$ to the soluble plutonyl ion ($PuO_2^{+2}$) in which the plutonium exhibits an oxidation state of (VI). One disadvantage of this oxidative dissolution process for nuclear fuel reprocessing is the observed behavior of ruthenium. Ruthenium is always present as a fission product in irradiated fuels. For example, a typical 1000 kg. batch of irradiated liquid metal fast breeder reactor (after about 10% burnup) contains 200–250 kg. plutonium (as $PuO_2$) and about 6 kg. ruthenium with the remainder uranium and other fission products. Due to its multiplicity of available oxidation states and tendency to form complex ions, ruthenium's behavior (especially in the presence of oxidizing or reducing agents) is largely unpredictable and always of primary concern in fuel reprocessing processes. In oxidative dissolution with cerium ions, ruthenium is also oxidized (to $RuO_4$) and volatilizes, causing serious radioactive materials handling problems. Furthermore, some of the volatile ruthenium species condense and are reduced back to $RuO_2$ which re-enters the dissolving solution and interfere with the Pu oxidation, catalyzing the reduction of Ce(IV) to Ce(III) thereby preventing Pu(IV) oxidation. Fear of ruthenium volatilization has militated against dissolution processes involving oxidation processes.

The ruthenium volatilization problem is avoided in a non-oxidative dissolution process. Some success has been achieved in the prior art with an essentially non-oxidative, fluoride-catalyzed dissolution. In this process $PuO_2$ is dissolved by contacting with aqueous $HNO_3$ (about 8 to 16 M) in the presence of an effective catalytic amount of fluoride (about 0.05 to 0.30 M). The fluoride ion catalyzes the $PuO_2$ dissolution without oxidizing plutonium. The fluoride ion is preferably added as HF to avoid extraneous ions. Of course, regardless of the fluoride added, it will behave in an acid medium substantially as HF and will be delineated herein as an $HNO_3$-HF dissolvent. While this fluoride-catalyzed non-oxidative dissolution process is effective for preventing ruthenium volatilization, there are certain disadvantages inherent. For example, after a period of time the dissolution rate decreases and comes to a near stop. Apparently, fluoride ion is consumed in the dissolution reaction and constant addition of fluoride is necessary to sustain the dissolution rate. In some cases refractory $PuO_2$ is not completely dissolved even after long periods of digestion and stoichiometric addition of fluoride. Of course, it would be desirable in any fuel reprocessing application that the $HNO_3$ and the fluoride ion concentrations be minimized to lessen the corrosive nature of the dissolving solution.

SUMMARY OF THE INVENTION

It is an object of the present invention to provide a method for dissolving $PuO_2$ in nitric acid whereby dissolution is substantially complete.

It is a further object to provide a method for enhancing the rate of dissolution of $PuO_2$ in a mixed nitric-hydrofluoric acid.

It is a further object to reduce the fluoride concentration of the dissolving solution, thereby reducing the corrosiveness of the solution.

It is a further object to reduce or eliminate the consumption of fluoride during the dissolution of $PuO_2$ in mixed nitric-hydrofluoric acid.

These and other objects are accomplished according to this invention by providing a method for dissolving $PuO_2$ in an aqueous dissolving mixture comprising $PuO_2$, $HNO_3$ and an effective catalytic amount of fluoride, the improvement comprising increasing the rate of dissolution by providing oxidizing conditions in the dissolving mixture to oxidize dissolved Pu ions. It is believed that when the dissolved plutonium is oxidized, fluoride ions are released from a soluble plutonium-fluoride complex for further catalytic action. By this method fluoride is no longer consumed in the dissolution process and the dissolution rate no longer decreases substantially with time. Unexpectedly, dissolved ruthenium did not volatilize and did not interfere with the oxidation of dissolved plutonium ions. According to this invention, the oxidation may be carried out in any effective manner which does not interfere with the catalytic action of fluoride, preferably by electrolytic oxidation.

DETAILED DESCRIPTION

In furtherance of the objects of this invention, kinetic studies of $PuO_2$ dissolution in aqueous $HNO_3$-HF solution were undertaken. A study of $PuO_2$ dissolution rates in solutions of various $HNO_3$ and HF concentrations revealed that the initial $PuO_2$ solubility rate is higher for higher $HNO_3$ concentrations and for higher HF concentrations. Furthermore, log-log plots of initial dissolution rates vs. initial fluoride concentration in solutions of constant acid activity revealed that the kinetics of the dissolution reaction in the $HNO_3$-HF system is first order with respect to HF concentration.

Figure 1:
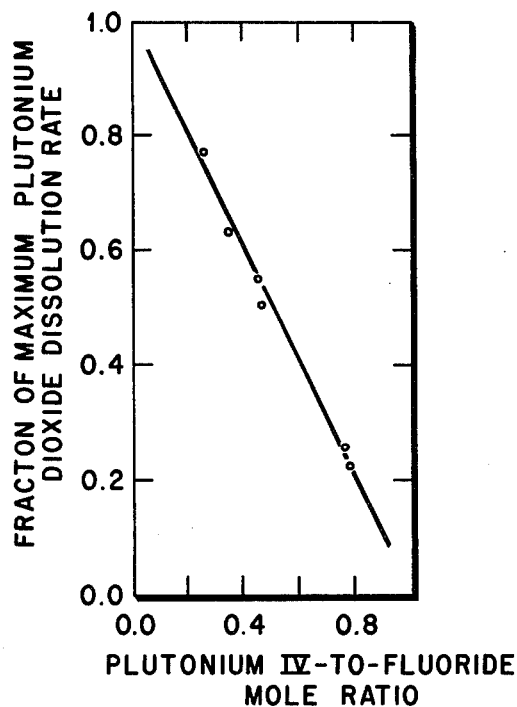
FIG. 1 is a graph of $PuO_2$ dissolution rate vs. Pu(IV)/F mole ratio showing the decrease in dissolution rate as dissolved Pu(IV) concentration increases.

An experimental demonstration of the variation of the initial dissolution rate with respect to time is represented in FIG. 1. This experiment was carried out as follows:

One half gram of $PuO_2$ microspheres of a refractory, difficultly soluble type (considered to be no less difficult to dissolve than the $PuO_2$ in residues from liquid metal fast breeder type fuel rods) was digested at 100° C in a polytetrafluoroethylene container in 30 ml. of a solution 10 M in $HNO_3$ and 0.02 M in HF.

The data are shown in FIG. 1 wherein the fraction of maximum dissolution rate is plotted vs. Pu(IV)/fluoride mole ratio (the concentration of dissolved Pu(IV) with respect to initial fluoride concentration). The resulting curve has a slope of minus one, indicating that the decrease in dissolution rate is directly proportional to the increase in $Pu(IV)/F^{-1}$ mole ratio. The fraction of maximum dissolution rate is defined as the dissolution rate at a given time divided by the initial dissolution rate (found to be the maximum rate). This linear relationship with a slope of minus one indicates the formation of a Pu(IV)-fluoride complex with a one-to-one mole ratio, thereby causing the decrease in reaction rate as the fluoride ion is complexed. For all practical purposes, it can be concluded that the formation of this complex limits the total quantity of Pu which can be dissolved with a given amount of HF. It can therefore be concluded that the mechanism of dissolution of $PuO_2$ in $HNO_3$-HF solutions is by the formation of a soluble $PuF^{+3}$ complex. Note that the Pu(IV) in the $PuO_2$ is not oxidized in this fluoride-catalyzed dissolution method.

It has been discovered according to this invention that the fluoride catalyzed dissolution of plutonium dioxide in $HNO_3$ is significantly enhanced in rate by oxidizing dissolved plutonium ions. Based upon kinetic studies, it is believed that oxidizing dissolved plutonium releases fluoride ions from the soluble $PuF^{+3}$ complex, with concurrent formation of soluble plutonyl ion, $PuO_2^{+2}$. Unexpectedly, dissolved ruthenium ions did not interfere with the plutonium oxidation. It should be noted that the method of this invention is still essentially a non-oxidative dissolution process since the plutonium is not oxidized during the dissolution reaction but only after dissolution.

Oxidizing conditions have very little effect on the dissolution rate of $PuO_2$ in $HNO_3$ in the absence of fluoride. For example only 1.2 miligram of $PuO_2$ was dissolved after 1.0 gram of $PuO_2$ was digested at 100° C in 50 ml. 8.0 M $HNO_3$ for 24 hours under electrolytic oxidation. Electrolytic oxidation was carried out with an applied potential of 2 volts with 100 milliamps current. The total dissolved Pu concentration was 0.0001 moles/liter.

All that is required to carry out the method of this invention is that $PuO_2$ be contacted with an aqueous $HNO_3$ dissolving solution containing an effective catalytic amount of fluoride under oxidizing conditions. The proper oxidizing conditions may be established in the dissolving solution electrolytically or by any non-interfering oxidizing agent. Electrolytic oxidation may be carried out by any conventional means of passing electrolytic current through the solution with corrosion resistant electrodes such as platinum.

For dissolution of irradiated fuels with electrolytic oxidation, it is desirable to regulate the standard potential of the anolyte to a value intermediate the standard potentials for the following reactions:

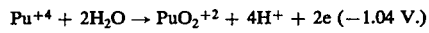

$$Pu^{+4} + 2H_2O \rightarrow PuO_2^{+2} + 4H^+ + 2e \, (-1.04 \text{ V.})$$

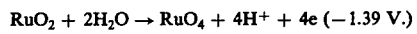

$$RuO_2 + 2H_2O \rightarrow RuO_4 + 4H^+ + 4e \, (-1.39 \text{ V.})$$

By maintaining the cell potential between about −1.15 V. and −1.25 V. (with respect to a hydrogen electrode) dissolved plutonium is oxidized without volatilization of dissolved ruthenium. The proper applied potential may be routinely determined by measuring the standard cell potential. For purposes of this invention, a non-interfering oxidizing agent is one (such as $Ag_2O_2$) which operates to oxidize dissolved plutonium without itself complexing available fluoride ions. According to the present invention, fluoride is no longer required in stoichiometric amounts with respect to Pu. While the rate of dissolution may be enhanced by adding greater amounts of fluoride, all that is necessary is an effective catalytic amount since the fluoride ion is now returned to the solution rather than being tied up in the $PuF^{+3}$ complex ion. For purposes of this invention, an effective catalytic amount is that amount, independent of Pu stoichiometry, which will effectively catalyze the $PuO_2$ dissolution for the particular $HNO_3$ concentration used and may be routinely determined for the desired application. According to the present invention, sustained dissolution rates no longer require high initial fluoride concentrations and the necessary fluoride ion concentration may now be reduced to less than 0.01 M to suit the corrosion resistance of the dissolving vessel.

To illustrate the method of this invention the following examples are presented. The requisite oxidation of dissolved plutonium is accomplished by an oxidating agent in Examples I and II and by electrolytic oxidation in Examples III and IV. The dissolutions were performed on refractory $PuO_2$ microspheres of 98% theoretical density thought to be representative of the most difficultly soluble $PuO_2$ likely to be encountered in nuclear reprocessing of breeder reactor fuel.

EXAMPLE I

Figure 2:
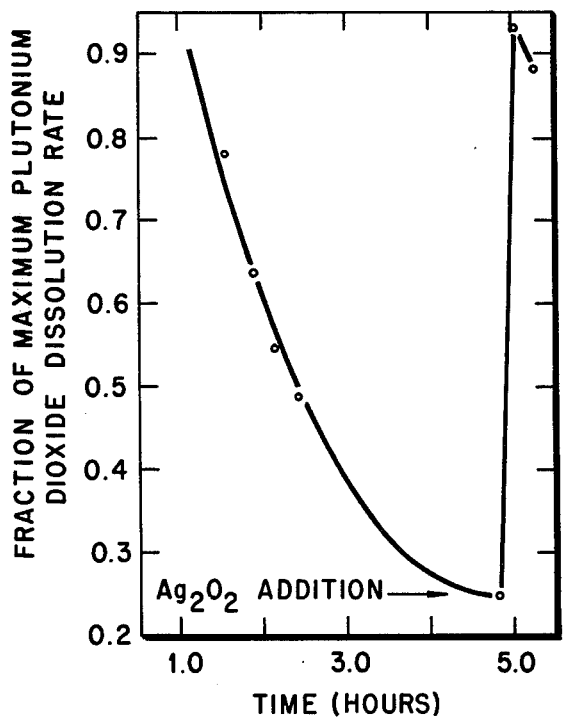
FIG. 2 is a graph of $PuO_2$ dissolution rate vs. time showing the effect of $Ag_2O_2$ addition.

This example illustrates the dramatic increase in dissolution rate of $PuO_2$ as a result of $Ag_2O_2$ addition graphically depicted in FIG. 2. One half gram of refractory $PuO_2$ microspheres was digested at 100° C in polytetrafluoroethylene equipment in 30 ml. of 10 M $HNO_3$ − 0.02 M HF solution. The initial dissolution rate for the sample was approximately $10.4 \times 10^{-4}$ moles per liter, per hour. At the end of 24 hours enough plutonium had dissolved to provide a $Pu(IV)/F^{-1}$ mole ratio of 0.75. The dissolution rate had then decreased to about one-fourth the initial rate. At this point 0.50 gram of $Ag_2O_2$ was added to the solution. Oxidation of the dissolved plutonium occured during the next three hours as evidenced by analysis for Pu(IV) and Pu(VI). The mole ratio of Pu(IV) in solution to initial fluoride decreased to 0.25 and the dissolution rate increased to greater than 85 percent of the initial rate.

EXAMPLE II

This example provides a comparison of $PuO_2$ dissolutions both with and without the addition of oxidizing agent. One half gram samples of $PuO_2$ microspheres were digested at 100° C in polytetrafluoroethylene equipment in 40 ml. volumes of 8 M $HNO_3$ − 0.02 M HF solution with and without $Ag_2O_2$ addition. The data in the table show that after 174 hours of dissolution in 8 M $HNO_3$ − 0.02 M HF there is 51.0% more total plutonium dissolved with $Ag_2O_2$ addition than without the addition. The data in the table shows that the dissolution with $Ag_2O_2$ results in large fractions of the dissolved plutonium being oxidized to the plutonyl ($PuO_2^{+2}$) state. While some oxidation of dissolved plutonium occurs without $Ag_2O_2$ addition, the significant increase in dissolution rate corresponds to the greatly increased amount of Pu(VI) in solution with $Ag_2O_2$ addition.

| Effect of $Ag_2O_2$ Addition[a] on Plutonium in 8 M $HNO_3$ − 0.02 M HF Dissolvents at 100° C | | |
|---|---|---|
| Time (hr) | Percentage Increase in $PuO_2^{+2}$ Concentration Resulting from $Ag_2O_2$ Addition | Percentage Increase in Total Pu Concentration Resulting from $Ag_2O_2$ Addition |
| 51 | 65.5 | 8.0 |
| 75 | 204.3 | 10.1 |
| 129 | 247.8 | 28.7 |
| 174 | 325.0 | 51.0 |

[a]Added 100 mg. of $Ag_2O_2$ every 24 hours.

Figure 3:
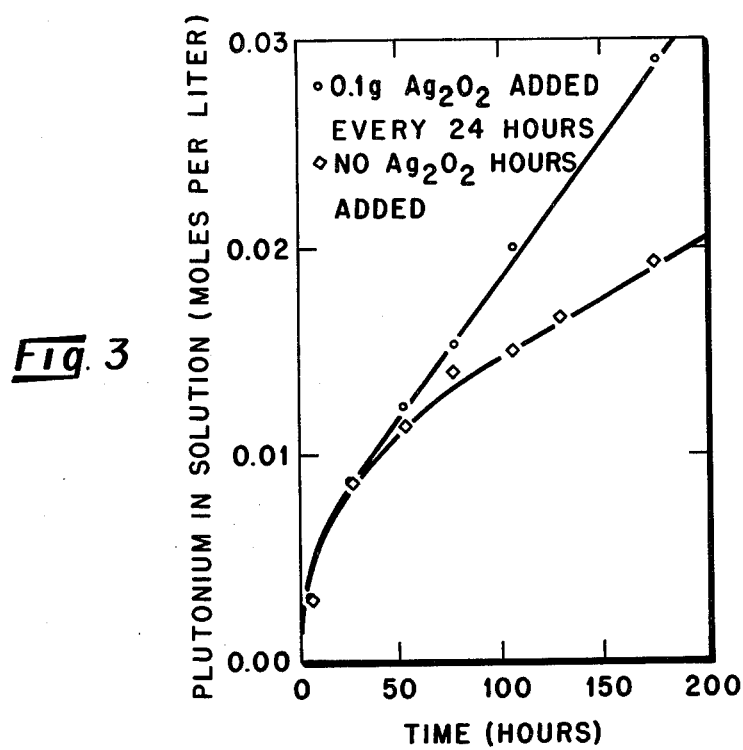
FIG. 3 is a graph of total plutonium ion concentration in solution vs. time for solution with and without periodic $Ag_2O_2$ addition.

The increased plutonium dissolution rates resulting from the $Ag_2O_2$ additions can be seen in FIG. 3 where plutonium concentrations in the dissolvents are plotted as a function of dissolution time for dissolutions with and without $Ag_2O_2$ additions. The curves in the FIG. 3 show that the initial dissolution rates are the same with and without $Ag_2O_2$ additions but that the rate without $Ag_2O_2$ addition decreases much faster than does the rate with $Ag_2O_2$ addition.

EXAMPLE III

Figure 4:
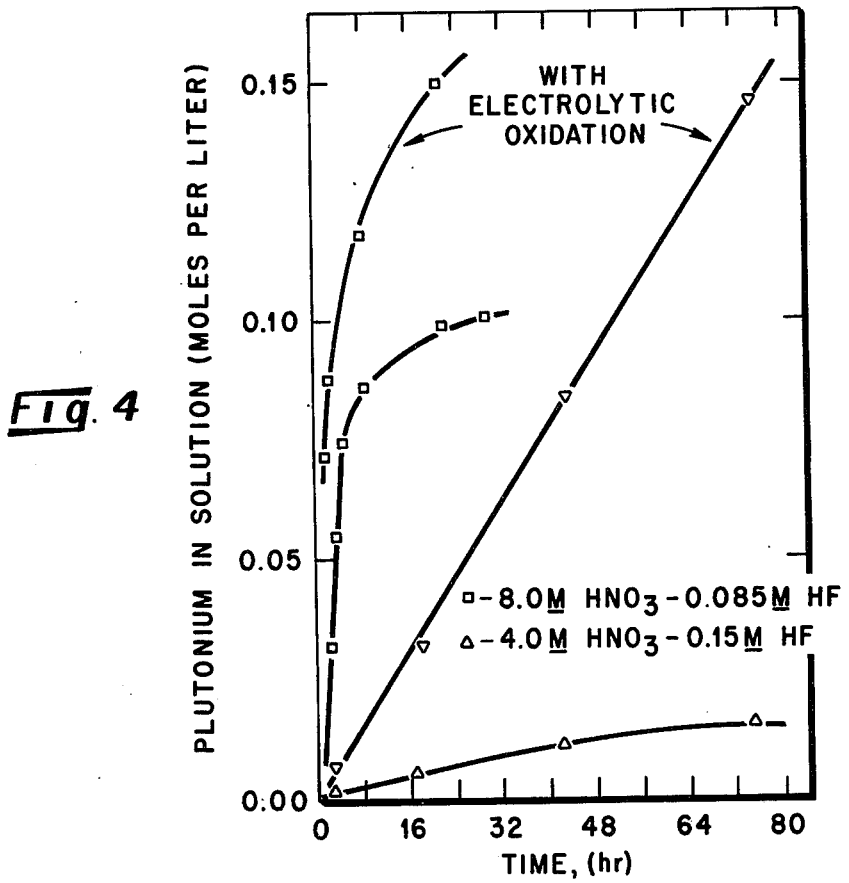
FIG. 4 is a graph of total plutonium ion concentration in solution vs. time for two acid solutions with and without electrolytic oxidation.

This example demonstrates the effect of electrolytic oxidation on $PuO_2$ dissolution in $HNO_3$-HF solutions. 1.2 gram samples of $PuO_2$ microspheres were digested at 100° C in 30 ml. volumes of $HNO_3$-HF solutions with and without electrolytic oxidation. The results are depicted in FIG. 4. The electrolytic oxidations of this example were carried out by immersing platinum wire electrodes (0.2 cm. diameter) about 1.8–2.0 cm. apart, directly in the dissolver solutions to a depth of 8 cm. within a 2.3 cm. diameter polytetrafluoroethylene cylinder. The applied potential was 2.0 V. and the current flow was 200 mA. The cathode was enclosed in a polytetrafluoroethylene sleeve and vented separately. Electrolytic oxidation for 28 hours in an 8.0 M $HNO_3$–0.085 M HF dissolvent resulted in a 75% increase in $PuO_2$ dissolution. The relative effects were even more striking in a 4.0 M $HNO_3$–0.15 M HF dissolvent where there was a more than 800% increase in $PuO_2$ dissolution after 72 hours. Even after 100 hours, no sharp decrease in $PuO_2$ dissolution rate occurs.

EXAMPLE IV

This example demonstrates that the oxidation of dissolved plutonium according to this invention may be carried out in the presence of ruthenium and without ruthenium volatilization. 0.50 gram samples of $PuO_2$ microspheres were digested in 40 ml. volumes of 8.0 M $HNO_3$–0.10 M HF –0.10 M ruthenium with and without electrolytic oxidation as in Example III. The quantity of plutonium dissolved with electrolytic oxidation was more than 100% greater than that without the oxidation at the end of 24 hours, and was 45% in the plutonyl state. The ruthenium in the dissolvents was traced with $^{106}$Ru. Based on gross gamma and gamma scan analyses, the concentration of ruthenium in the dissolvents did not change significantly during the dissolutions, indicating that ruthenium volatilization did not occur.

The beneficial effect of oxidizing conditions on the non-oxidative fluoride-catalyzed nitric acid dissolution of $PuO_2$ was unexpected, especially in view of my experience with various oxidizing agents in this system. The addition of sodium dichromate, a strong oxidizing agent, to a dissolving mixture of refractory $PuO_2$ microspheres (about 98% theoretical density) in 8 M $HNO_3$– 0.02 M HF oxidized the Pu already in solution to $PuO_2^{2+}$, but did not increase the dissolution rate of solid $PuO_2$. Similarly, the addition of Ce(IV) ions, as in the prior art oxidative dissolution process, to a similar dissolving solution not only did not cause complete dissolution of the microspheres but acutally retarded dissolution. It was even more unexpected that the oxidation would increase the dissolution rate in the presence of ruthenium ions as are found in dissolving mixtures of irradiated fuels. Past experience with cerium in $HNO_3$ — HF dissolvents containing dissolved ruthenium has been that dissolution rates were not increased. It is now believed that this was probably due to fluoride complexation and the tendency of ruthenium to be oxidized preferentially to plutonium.

An additional advantage to the method of this invention is that plutonium precipitation is prevented by the oxidation of dissolved plutonium ions. It has been observed experimentally that at the higher fluoride concentrations favorable for high dissolution rates (greater than about 0.1 M) and in the absence of oxidation, the formation of an insoluble $PuF_2^{+2}$ complex occurs, thereby retarding the overall plutonium dissolution rate. When dissolved plutonium ions are oxidized according to this invention, the insoluble complex does not appear.

This invention has been illustrated by experimental demonstrations which show the operability of this process. These laboratory-scale examples may be readily amplified to industrial scale by those skilled in the art. As has been demonstrated, the $HNO_3$ concentration is not critical to the operativeness of this process (with good results attainable even at 4.0 M $HNO_3$) and may now be tailored to accommodate the corrosion resistance of the equipment. While electrolytic oxidation appears most attractive for large scale applications, chemical oxidizing agents such as $Ag_2O_2$ may be used without departing from my inventive concept. It is now believed that the reason that cerium ions and sodium dichromate did not aid the $HNO_3$—HF dissolution was that Ce and Cr ions themselves complexed fluoride ions. Other metal ions which have been found to complex fluoride in $HNO_3$—HF are $Zn^{+2}$, $La^{+3}$, $Ca^{+3}$, $Al^{+3}$, $Th^{+4}$, and $Zr^{+4}$. Contemplated equivalents of $Ag_2O_2$ in this method are those oxidizing agents capable of oxidizing Pu ions dissolved in $HNO_3$—HF solutions to increase the $PuO_2$ dissolution rate without themselves substantially complexing fluoride ions.

With the enhanced dissolution rates now available according to this invention, the dissolution may be efficiently carried out even at below the boiling temperature of the acid, with higher dissolution rates available at elevated temperatures. The preferred temperature of the dissolving mixture is now about 100° C.

What is claimed is:

1. In a method for dissolving $PuO_2$ in an aqueous dissolving mixture comprising $PuO_2$, $HNO_3$ and an effective catalytic amount of fluoride, the improvement comprising providing oxidizing conditions in said dissolving mixture to oxidize dissolved Pu ions and thereby increase the rate of $PuO_2$ dissolution.

2. The method of claim 1 wherein said oxidizing conditions are provided electrolytically.

3. The method of claim 1 wherein said dissolving mixture contains dissolved ruthenium.

* * * * *